(12) United States Patent
Hanamoto

(10) Patent No.: US 8,275,211 B2
(45) Date of Patent: Sep. 25, 2012

(54) IMAGE PROCESSING APPARATUS AND METHOD

(75) Inventor: Takashi Hanamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 12/332,693

(22) Filed: Dec. 11, 2008

(65) Prior Publication Data

US 2009/0154827 A1 Jun. 18, 2009

(30) Foreign Application Priority Data

Dec. 14, 2007 (JP) ................................. 2007-324011

(51) Int. Cl.
 *G06K 9/36* (2006.01)
 *G06K 9/40* (2006.01)
(52) U.S. Cl. ....................................... 382/260; 382/254
(58) Field of Classification Search .................. 382/254, 382/260, 100, 108; 345/581, 582, 584
See application file for complete search history.

(56) References Cited

U.S. PATENT DOCUMENTS

| 5,940,049 A | * | 8/1999 | Hinman et al. ................. 353/20 |
| 7,290,950 B2 | * | 11/2007 | Donahoe et al. ................ 400/76 |

FOREIGN PATENT DOCUMENTS

| JP | 2002-103726 A | 4/2002 |
| JP | 2004-102900 A | 4/2004 |

OTHER PUBLICATIONS

Japanese Office Action for Application No. 2007-324011 dated Dec. 5, 2011.
English translation of the Japanese Office Action for Appln. No. 2007-324011 dated Dec. 5, 2011.

* cited by examiner

*Primary Examiner* — Yon Couso
(74) *Attorney, Agent, or Firm* — Carter, DeLuca, Farrell & Schmidt LLP

(57) ABSTRACT

This invention is to easily generate a normal map at a low cost. Hence, image data representing the characteristic of the surface of paper is inputted using an image input device. The type of finish of the paper is determined. Filtering processing corresponding to the type of finish is performed for the image data. A normal map is generated from the image data on which the filtering processing is performed.

9 Claims, 14 Drawing Sheets

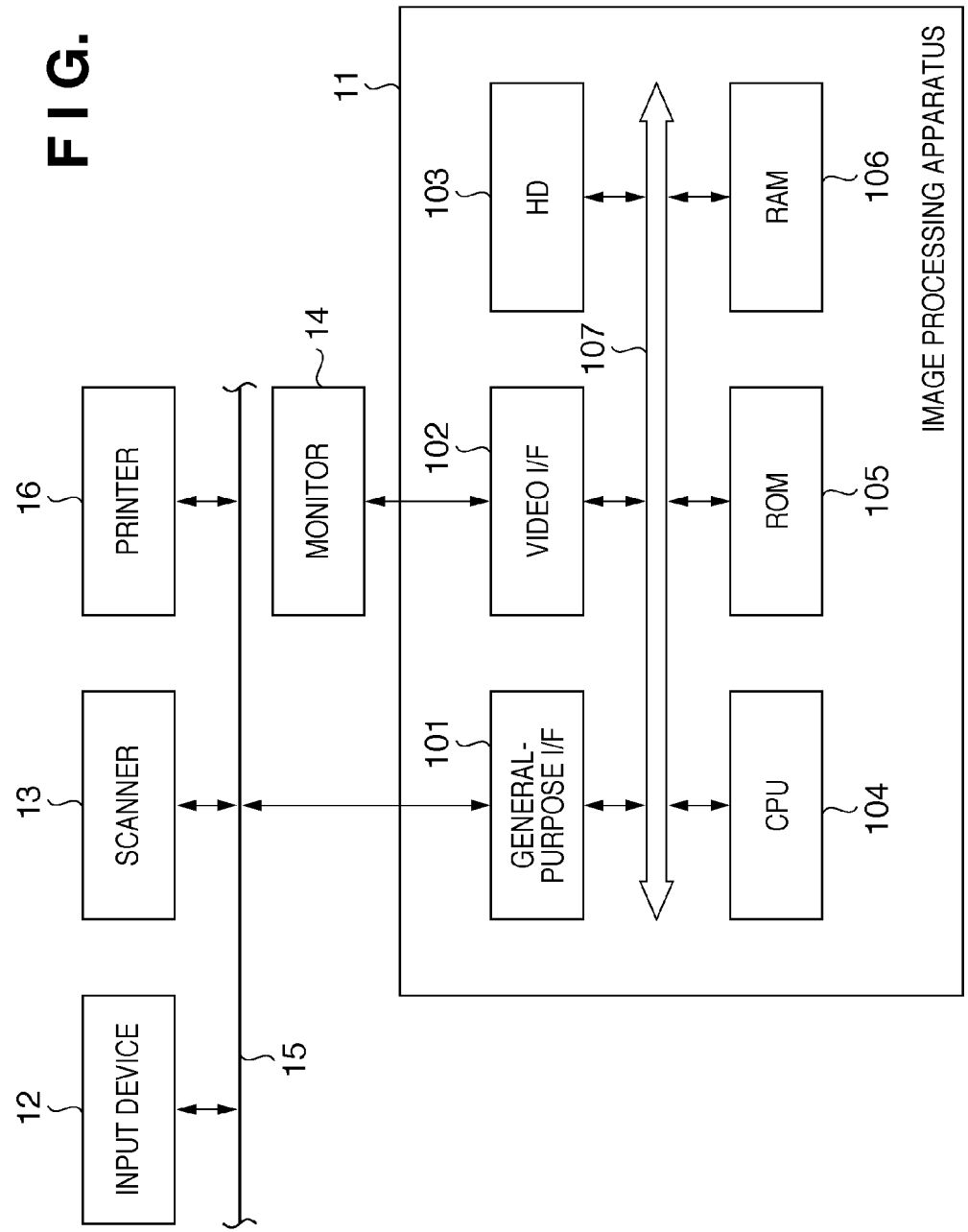

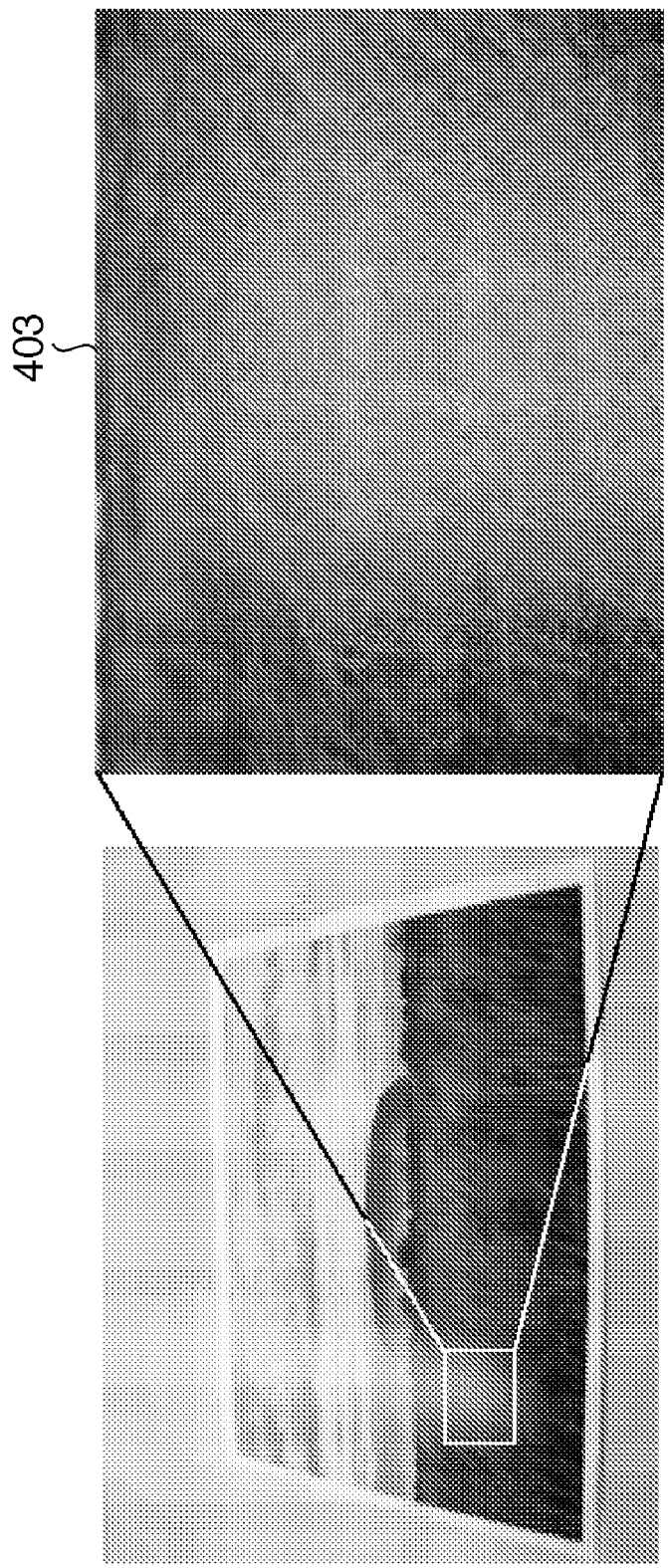

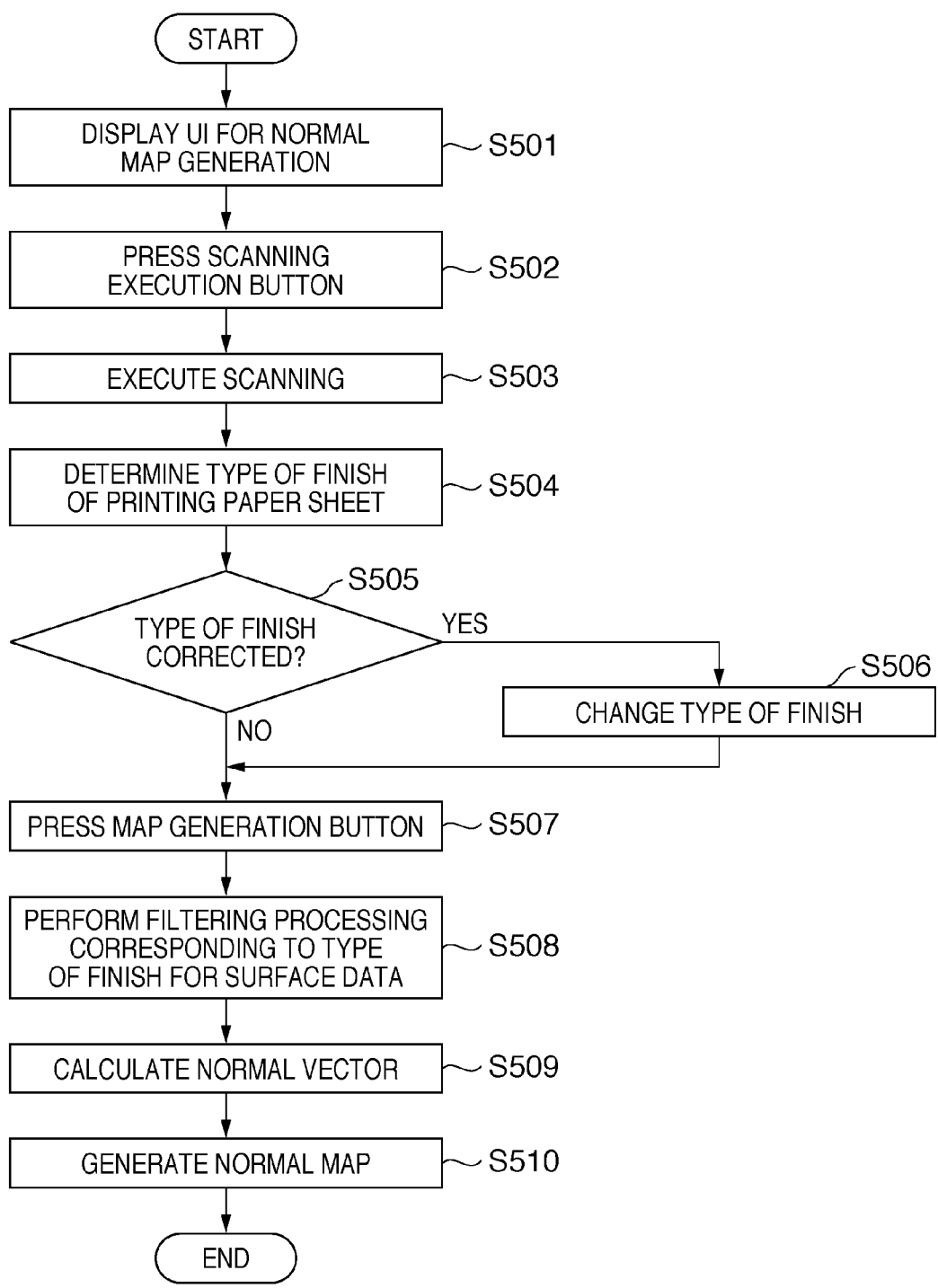

| 1/9 | 1/9 | 1/9 |
|-----|-----|-----|
| 1/9 | 1/9 | 1/9 |
| 1/9 | 1/9 | 1/9 |

EXAMPLE OF MEDIAN FILTER

FIG. 7C

| -1 | -1 | -1 |
|----|----|----|
| -1 | 8  | -1 |
| -1 | -1 | -1 |

EXAMPLE OF HIGH-PASS FILTER

IMAGE PROCESSING APPARATUS AND METHOD

BACKGROUND OF THE INVENTION

1. Field of the Invention

The present invention relates to an image processing apparatus and method, more specifically, generation of a normal map for preview.

2. Description of the Related Art

When printing an image, the color appearance may largely change between printing paper sheets to be used for printing. The factors that change the color appearance include the gloss of a printing paper sheet, and the color difference between printing paper sheets. Bumpiness on the surface of a printing paper sheet is also a large factor. For example, the color appearance of a printed image largely changes between printing paper (e.g., glossy paper) having a smooth surface and half-glossy paper (to be referred to as matte finished paper hereinafter) having bumpiness formed by matte finish.

On the other hand, computer graphics (to be referred to as CG hereinafter) uses a bump mapping method to express bumpiness on an object surface. This technique virtually expresses bumpiness on an object surface by tilting, in an arbitrary direction, a normal vector which determines the reflecting direction of light incident on the object surface. The use of the normal vector allows reproduction of the bumpiness on the surface of matte finished paper. Applying the CG technique to print preview enables more real print preview.

To use the bump mapping method, a normal vector map (to be referred to as a normal map hereinafter) which bitmaps a bundle of normal vectors is necessary. As normal map generation methods, techniques using a dedicated device are disclosed. In these techniques, bumpiness on an object surface is read by a dedicated device, thereby generating a normal map.

In the above-described methods using a dedicated device, the dedicated device itself is expensive, and its method of use is special. This makes it difficult to introduce the techniques.

SUMMARY OF THE INVENTION

In one aspect, a method of controlling an image processing apparatus, the method includes inputting image data representing a characteristic of a surface of paper, the image data being obtained by reading the surface of the paper using an image input device, determining a type of finish of the paper by analyzing the image data, performing filtering processing corresponding to the type of finish, and generating a normal map from the image data on which the filtering processing is performed.

According to the aspect, it is possible to easily generate a normal map at a low cost.

In another aspect, the above method further includes setting a rendering method corresponding to the type of finish, and generating a preview image corresponding to an image printed on the paper using the set rendering method, the normal map, and a bump mapping method.

According to the aspect, it is possible to do print preview that reflects bumpiness on the surface of paper.

Further features of the present invention will become apparent from the following description of exemplary embodiments with reference to the attached drawings.

BRIEF DESCRIPTION OF THE DRAWINGS

FIG. 1 is a block diagram showing the arrangement of an image processing apparatus according to a first embodiment of the present invention.

FIG. 4B is a view showing a print example of matte finished paper according to the first embodiment.

FIG. 5 is a flowchart illustrating an example of normal map generation processing according to the first embodiment.

FIG. 7A is a view for explaining 3×3 filtering processing according to the first embodiment.

FIGS. 7B and 7C are views showing examples of filter elements according to the first embodiment.

DESCRIPTION OF THE EMBODIMENTS

Figure 2A:
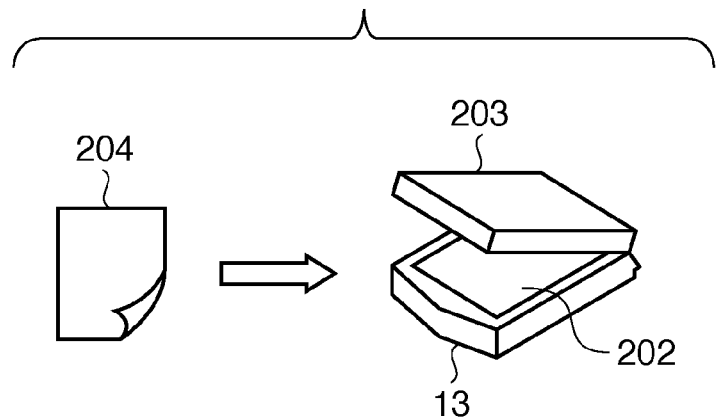
FIG. 2A is a view showing an outline of a scanner according to the first embodiment.

Image processing according to a first embodiment of the present invention will now be described in detail with reference to the accompanying drawings.

FIG. 1 is a block diagram showing the arrangement of an image processing apparatus 11 according to the first embodiment.

A microprocessor (CPU) 104 executes an operating system (OS) and various kinds of programs stored in a read-only memory (ROM) 105 or a hard disk (HD) 103 using a random access memory (RAM) 106 as a work memory. The CPU 104 controls the components to be described later via a system bus 107 and executes image processing to be described later.

The CPU 104 receives a user instruction from an input device 12 such as a keyboard or mouse connected to a serial bus 15 such as a USB (Universal Serial Bus) via a general-purpose interface (I/F) 101. An image input device such as a general-purpose scanner 13 and an image output device such as a printer 16 are also connected to the serial bus 15. The CPU 104 can read surface information of a printing paper sheet using the scanner 13, and this will be described later in detail.

The CPU 104 displays a graphical user interface (GUI) on a monitor 14 via a video I/F 102. The HD 103 stores various kinds of data such as image data in addition to the OS and the programs.

FIG. 2A is a view showing the outline of the scanner 13 according to the first embodiment. The scanner 13 includes a document table cover 203 which prevents entrance of ambient light, and a document table 202 on which a document is placed.

A user places a printing paper sheet 204 on the document table 202 and closes the document table cover 203. He/she operates the GUI displayed on the monitor 14 using the input device 12 to instruct the image processing apparatus 11 to execute scanning.

Upon receiving the user instruction, the CPU 104 controls the scanner 13 to read the surface of the printing paper sheet 204 and stores image data representing the surface of the printing paper sheet 204 in the HD 103.

Figure 2B:
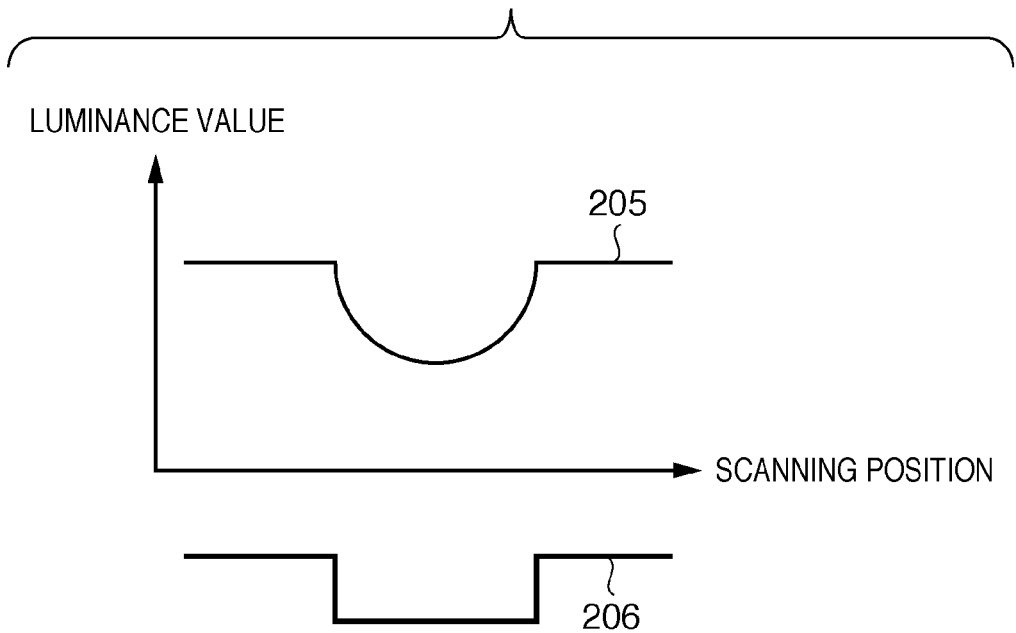
FIG. 2B is a graph showing the relationship between bumpiness on the surface of a printing paper sheet and image data acquired by scanning according to the first embodiment.

FIG. 2B is a graph showing the relationship between bumpiness on the surface of a printing paper sheet and image data acquired by scanning according to the first embodiment.

Assume that the printing paper sheet has a hollow at the central portion of the surface, as indicated by 206 in FIG. 2B. In this case, the pixel value (luminance value) read by the scanner 13 is small at the central portion (concave portion) of the printing paper sheet and large at two ends (convex portions), as indicated by 205. If the image data representing the surface of the printing paper sheet 204 is monochrome data, image data (to be referred to as surface data hereinafter) having a luminance distribution is obtained, in which the convex portions of the printing paper sheet exhibit a high luminance, and the concave portion exhibits a low luminance.

The use of the surface data allows acquiring the change (distribution) of the height of the printing paper sheet surface and generate a normal map. However, the data acquired by the scanner 13 cannot directly be used. The reason will be explained below.

Figure 3A:
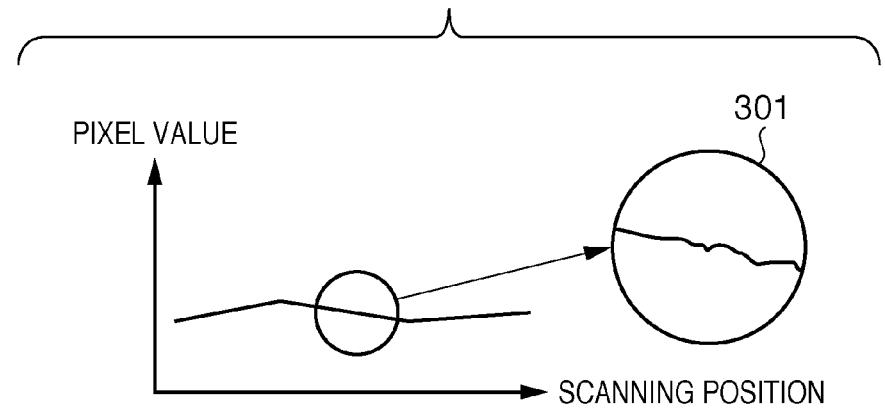
FIG. 3A is a graph showing an example of the distribution of pixel values obtained by scanning glossy paper according to the first embodiment.

FIG. 3A is a graph showing an example of the distribution of pixel values (luminance values) obtained by scanning glossy paper according to the first embodiment.

The pixel value distribution obtained by scanning glossy paper includes a variation in the pixel values of low-frequency components (to be referred to as low-frequency bumpiness hereinafter) which moderately changes. When part of the distribution is enlarged, a random change 301 in the pixel values (to be referred to as random bumpiness hereinafter) is observed. The low-frequency bumpiness results from unevenness of coating for obtaining gloss or distortion of the printing paper sheet itself.

Figure 4A:
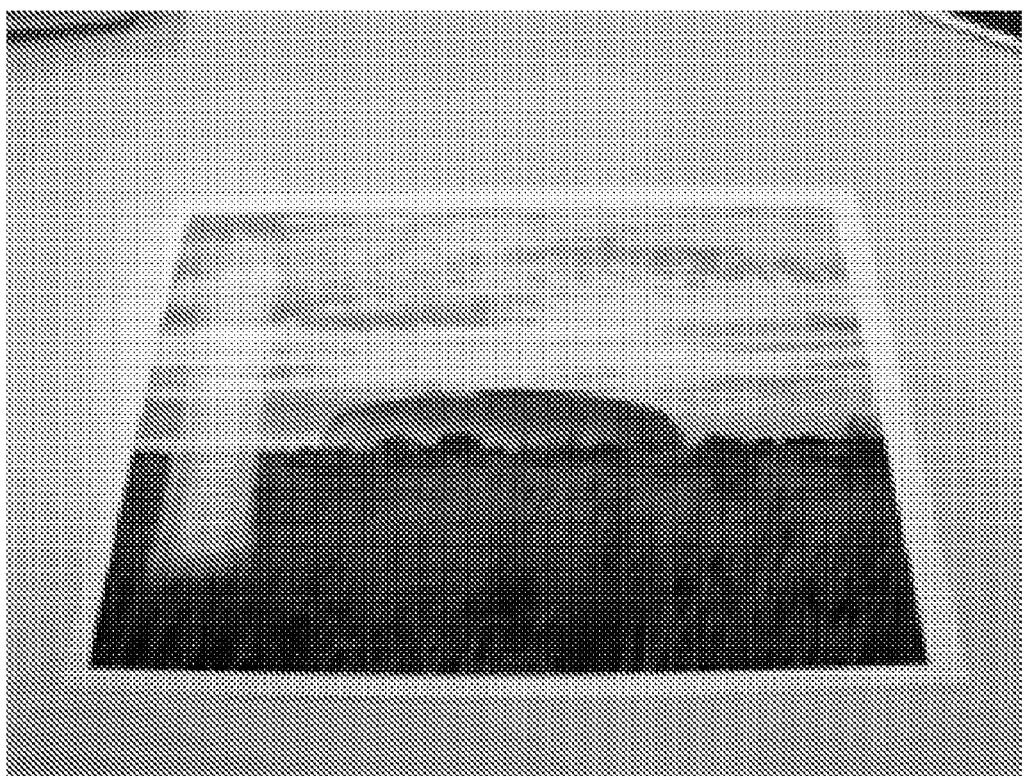
FIG. 4A is a view showing a print example of glossy paper according to the first embodiment.

FIG. 4A is a view showing a print example of glossy paper according to the first embodiment. An image (an image of a fluorescent lamp in this example) reflected by the surface of glossy paper looks distorted due to low-frequency bumpiness.

Random bumpiness is a noise component generated by the structure of the printing paper sheet surface. When a normal map is generated from surface data, the noise component on a reflected image looks like a flaw. Hence, processing of removing the random bumpiness (noise component) is essential.

Figure 3B:
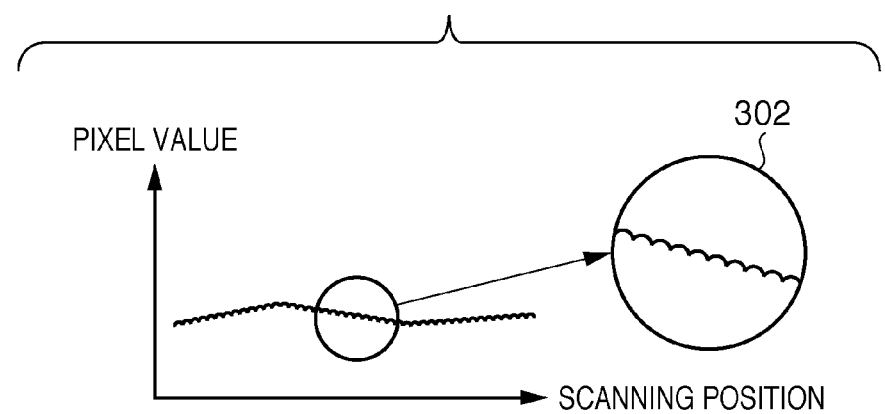
FIG. 3B is a graph showing an example of the distribution of pixel values obtained by scanning matte finished paper (half-glossy paper) according to the first embodiment.

FIG. 3B is a graph showing an example of the distribution of pixel values obtained by scanning matte finished paper (half-glossy paper) according to the first embodiment.

The pixel value distribution obtained by scanning matte finished paper includes low-frequency bumpiness. A variation in the pixel values of high-frequency components 302 (to be referred to as high-frequency bumpiness hereinafter) which abruptly changes is superimposed on the low-frequency bumpiness. The low-frequency bumpiness is caused by unevenness of coating or distortion of the printing paper sheet, like glossy paper. The high-frequency bumpiness results from matte finish.

FIG. 4B is a view showing a print example of matte finished paper according to the first embodiment. Fine bumpiness can be confirmed on the printing paper sheet surface, as indicated by an enlarged view 403. On the other hand, since the glossiness is low, and no reflection is observed, unlike glossy paper, low-frequency bumpiness is unnecessary in preview. Conversely, if pixel values in which low-frequency bumpiness remains are used to generate a normal map, the low-frequency bumpiness is noticeable, and high-frequency bumpiness which should be expressed is hard to see. Hence, processing of removing the low-frequency bumpiness is essential.

Figure 3C:
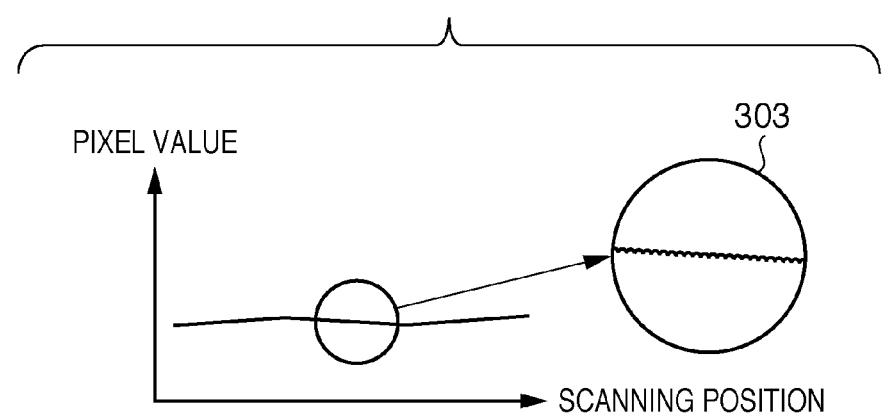
FIG. 3C is a graph showing an example of the distribution of pixel values obtained by scanning matte paper (non-glossy paper) according to the first embodiment.

FIG. 3C is a graph showing an example of the distribution of pixel values obtained by scanning matte paper (non-glossy paper) according to the first embodiment.

The pixel value distribution obtained by scanning matte paper includes low-frequency bumpiness having an amplitude smaller than glossy paper and matte finished paper. Bumpiness 303 of a frequency higher than matte finished paper is superimposed on the low-frequency bumpiness.

Figure 4C:
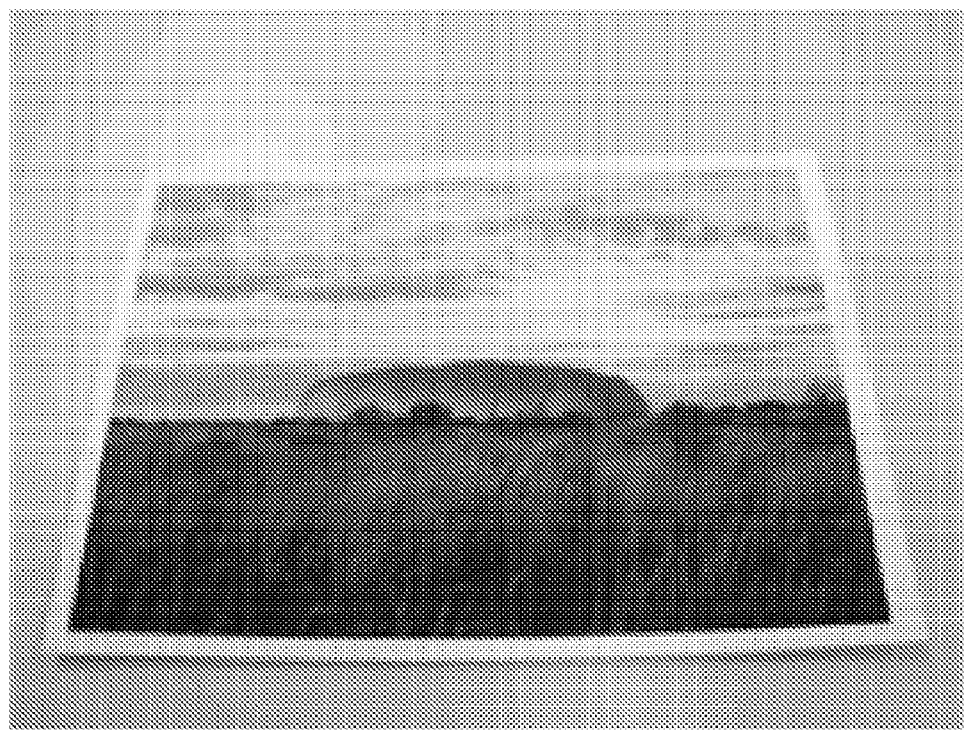
FIG. 4C is a view showing a print example of matte paper according to the first embodiment.

FIG. 4C is a view showing a print example of matte paper according to the first embodiment. Since neither reflection nor coating on the surface exists, unlike glossy paper, fine bumpiness representing the rough surface of the printing paper sheet itself can be confirmed. Since the matte paper has no gloss, low-frequency bumpiness is unnecessary in preview, and processing of removing the low-frequency bumpiness is essential, like the matte finished paper.

FIG. 5 is a flowchart illustrating an example of normal map generation processing according to the first embodiment. This processing is executed by the CPU 104 upon receiving a user instruction.

Figure 6:
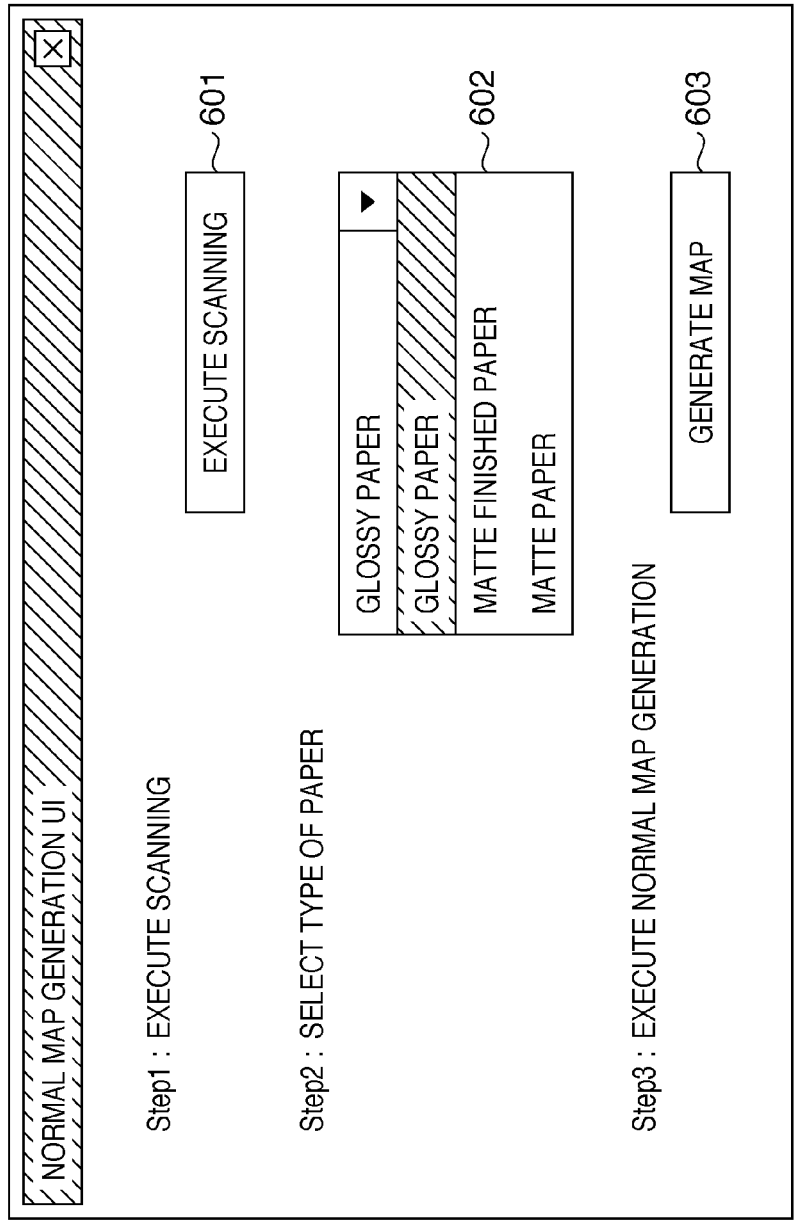
FIG. 6 is a view showing an example of a user interface for normal map generation according to the first embodiment.

The CPU 104 displays a user interface (UI) for normal map generation shown in FIG. 6 on the monitor 14 (S501) according to the first embodiment. The user sets a printing paper sheet to be used to generate a normal map on the document table 202 of the scanner 13 and closes the document table cover 203. The user presses a scanning execution button 601 on the UI (S502). The CPU 104 controls the scanner 13 to execute scanning and stores surface data having the bumpiness information of the printing paper sheet in the RAM 106 (S503). At this time, the CPU 104 sets, in the scanner 13 or scanner driver, image processing parameters to acquire the bumpiness information of the printing paper sheet as accurately as possible. More specifically, the CPU 104 inhibits the scanner 13 or scanner driver from doing automatic correction such as contrast correction or sharpness correction.

Next, the CPU 104 determines the type of finish of the printing paper sheet by analyzing low-frequency bumpiness and high-frequency bumpiness in the surface data (S504). In this processing, the type of finish is determined based on the correspondence between the surface data and the frequency characteristic (e.g., FIGS. 3A to 3C) of the luminance distribution corresponding to the type of finish. The CPU 104 expresses the determined type of finish as a "general type of printing paper sheet" and displays it in a combo box 602 on the UI, where the type of printing paper sheet is selected.

The CPU 104 determines whether the user has corrected the type of printing paper sheet, that is, the type of finish by operating the combo box 602 (S505). The user determines whether the type of printing paper sheet determined by the image processing apparatus 11 is correct. If the type is correct, the user presses a map generation button 603. Otherwise, the user corrects the type of printing paper sheet by operating the combo box 602 and then presses the map generation button 603. If the type of printing paper sheet, that is, the type of finish is corrected, the CPU 104 changes the type of finish in accordance with the user operation (S506).

When the map generation button 603 is pressed (S507), the CPU 104 performs filtering processing corresponding to the type of finish for the surface data (S508). FIG. 7A is a view for explaining 3×3 filtering processing according to the first embodiment. Filtering processing represented by a filter element 802 is executed for a central pixel (pixel e of interest) of a pixel array 801 in FIG. 7A. Then, a pixel value e' of the processing result is given by $$e' = A \times a + B \times b + C \times c + D \times d + E \times e + F \times f + G \times g + H \times h + I \times i \quad (1)$$

For finish of glossy paper, a median filter using a filter element as shown in FIG. 7B is used to remove the noise component according to the first embodiment. Any filter other than the median filter is usable if it can remove the noise component.

For finish of matte finished paper, a high-pass filter using a filter element as shown in FIG. 7C is used to reduce the low-frequency bumpiness according to the first embodiment. Any filter other than the high-pass filter is usable if it can reduce the low-frequency bumpiness.

For finish of matte paper, a high-pass filter is used, like matte finished paper. However, when filtering processing using a high-pass filter is performed, the high-frequency bumpiness is enhanced. To prevent this, for finish of matte paper, filtering processing using a high-pass filter is performed, and then, filtering processing using a median filter is further performed.

Next, the CPU 104 calculates normal vectors using the pixel values of the surface data on which filtering processing is performed (S509), and stores a normal map obtained by bitmapping the calculated normal vectors in the HD 103 (S510).

Figure 8:
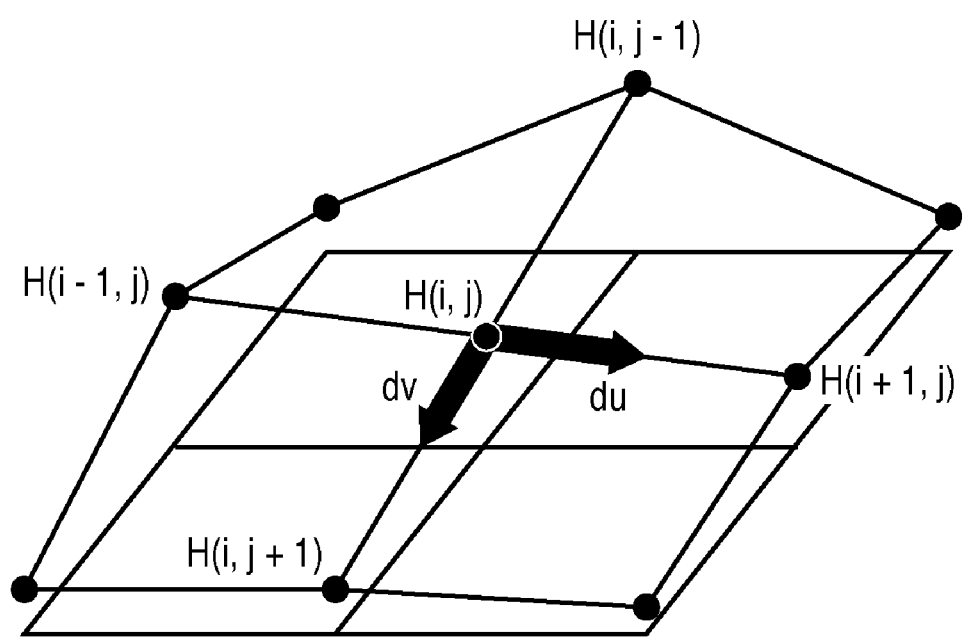
FIG. 8 is a view for explaining a normal vector calculation method according to the first embodiment.

FIG. 8 is a view for explaining a normal vector calculation method according to the first embodiment. Referring to FIG. 8, a pixel value represents a height. A height change between adjacent pixels is calculated. Let (i,j) be the coordinates of a pixel of interest, and H(i,j) be the pixel value of the pixel of interest. The average values of the height differences in the lateral direction (U-axis direction) and the longitudinal direction (V-axis direction) are given by $$dU = [H(i+1,j) - H(i-1,j)]/2$$

$$dV = [H(i,j+1) - H(i,j-1)]/2 \quad (2)$$

The vectors of tilts in the U- and V-axis directions in three-dimensional data are given by $$du = (1, 0, dU)$$

$$dv = (0, 1, dV) \quad (3)$$

Since a normal vector is perpendicular to du and dv, a normal vector N is given by $$N = du \times dv / |du \times dv| \quad (4)$$

Figure 9:
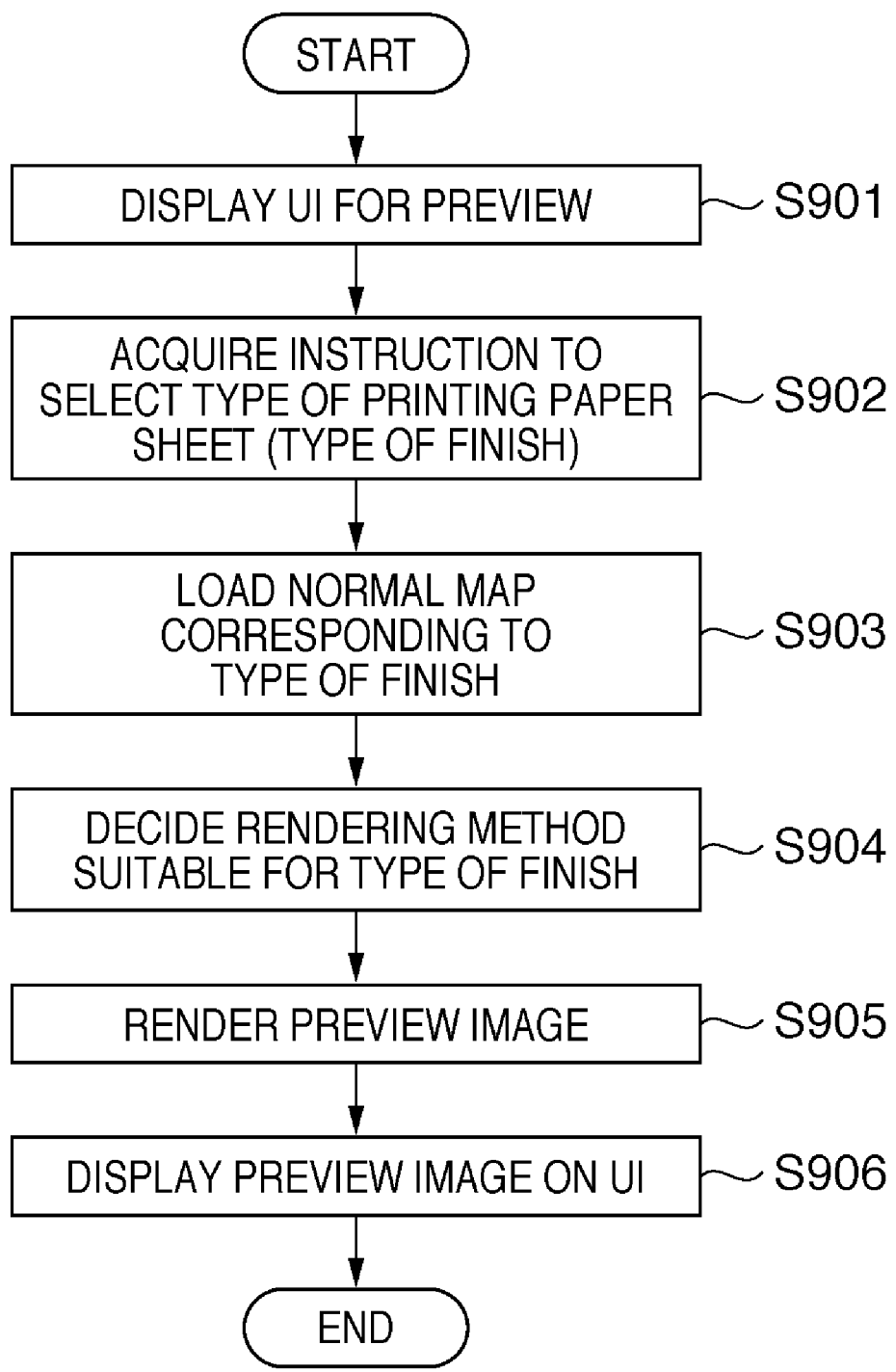
FIG. 9 is a flowchart illustrating an example of preview processing using a normal map according to a first embodiment.

FIG. 9 is a flowchart illustrating an example of preview processing using a normal map according to a first embodiment. This processing is executed by the CPU 104 upon receiving a user instruction.

Figure 10:
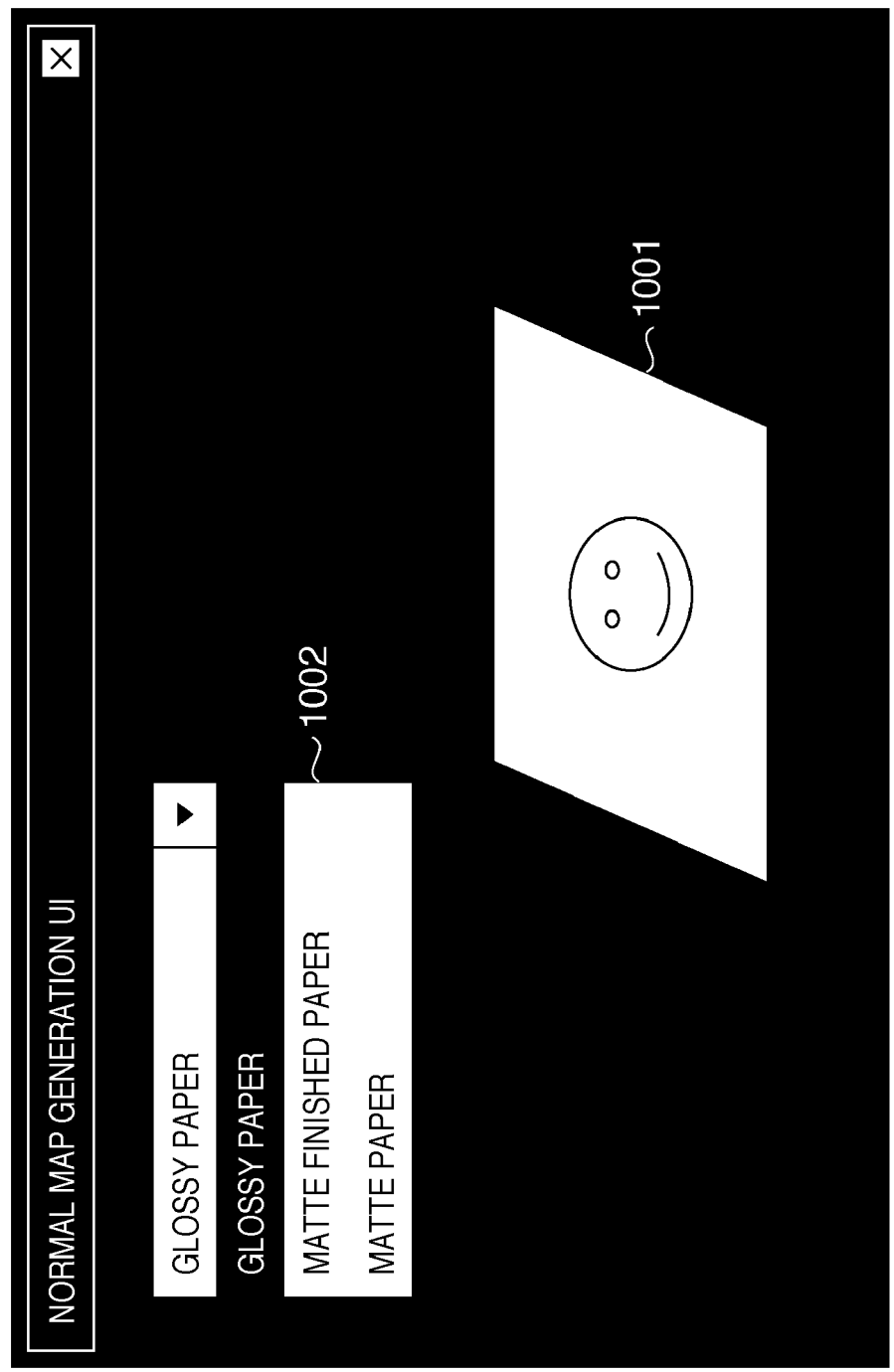
FIG. 10 is a view showing an example of a user interface for preview according to the first embodiment.

The CPU 104 displays a UI for preview shown in FIG. 10 on the monitor 14 (S901) according to the first embodiment. The user selects and designates the type of printing paper sheet to be used for image printing by operating a combo box 1002 on the UI. Note that the user designates a preview target image (print target image) before the preview display instruction via, for example, the UI of the printer driver executed by the CPU 104, as a matter of course.

Upon receiving the user instruction (S902), the CPU 104 reads out a normal map corresponding to the selected type of printing paper sheet (type of finish) from the HD 103 and loads it to the RAM 106 (S903). Then, the CPU 104 determines a rendering method suitable for the type of finish (S904).

The rendering method decision is processing necessary for increasing the reality of preview. For, for example, finish of glossy paper, to increase the sense of reality, the CPU determines a rendering method for reproducing an image containing a reflected image of, for example, a fluorescent lamp or a window. For finish of matte finished paper, to enhance surface bumpiness, the CPU determines a rendering method for reproducing highlight or shadow corresponding to low-frequency bumpiness. For finish of matte paper, reflection and low-frequency bumpiness are unnecessary. The CPU determines a rendering method for reproducing roughness on the printing paper sheet surface without reproducing reflection or low-frequency bumpiness.

Next, the CPU 104 renders a preview image using the determined rendering method, the normal map, and a bump mapping method (S905). This will be described later in detail. A rendered image 1001 is displayed on the preview UI (S906).

The characteristic of the printing paper sheet is reflected on the image 1001 displayed on the preview UI. That is, for finish of glossy paper, reflection of an image of a fluorescent lamp or window is reproduced. For finish of matte finished paper, bumpiness of matte finish on the surface is observed on an enlarged image. For finish of matte paper, roughness on the printing paper sheet surface is reproduced. The user who has satisfied the preview image instructs, via the UI of the printer driver, the printer 16 with designated printing paper sheets to output print data generated from the image data.

Figure 11:
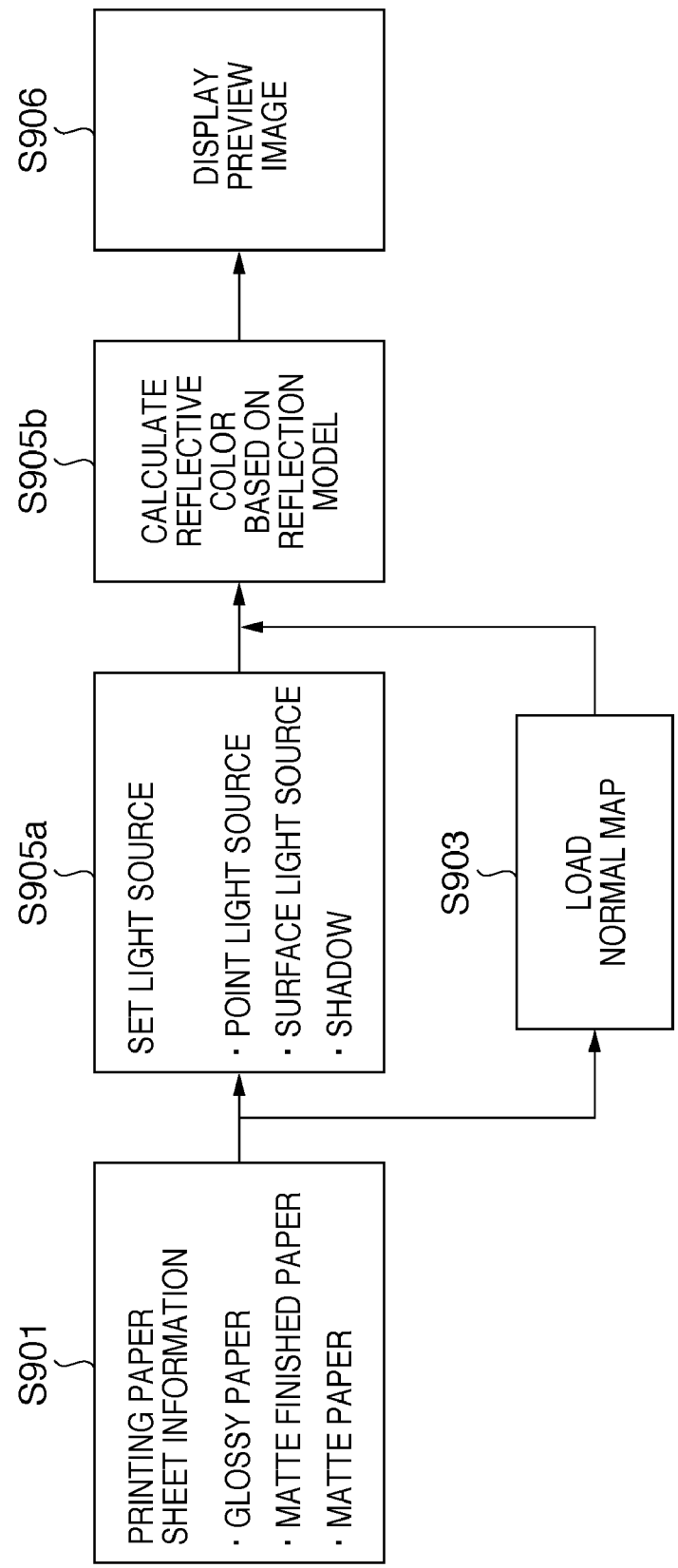
FIG. 11 is a view for explaining details of rendering according to the first embodiment.

FIG. 11 is a view for explaining details of rendering (S905) according to the first embodiment.

When the type of finish is determined in step S901, the CPU 104 sets a light source and ON/OFF of shadow processing corresponding to the type of finish (S905a). For finish of, for example, glossy paper or matte finished paper, a surface light source is selected to reproduce reflection. For finish of matte paper, a point light source is set because a surface light source only increases the process load and cannot improve the reality. For finish of matte finished paper, shadow processing is necessary to enhance surface bumpiness. For other finish, the shadow processing is not performed to reduce the process load.

Reflection models to be used for rendering include a diffuse reflection model to calculate the color of an object, and a glossy reflection model to calculate the glossy color of an object. The CPU 104 calculates reflective colors in the respective reflection models and adds the calculated reflective colors (S905b).

Figure 12:
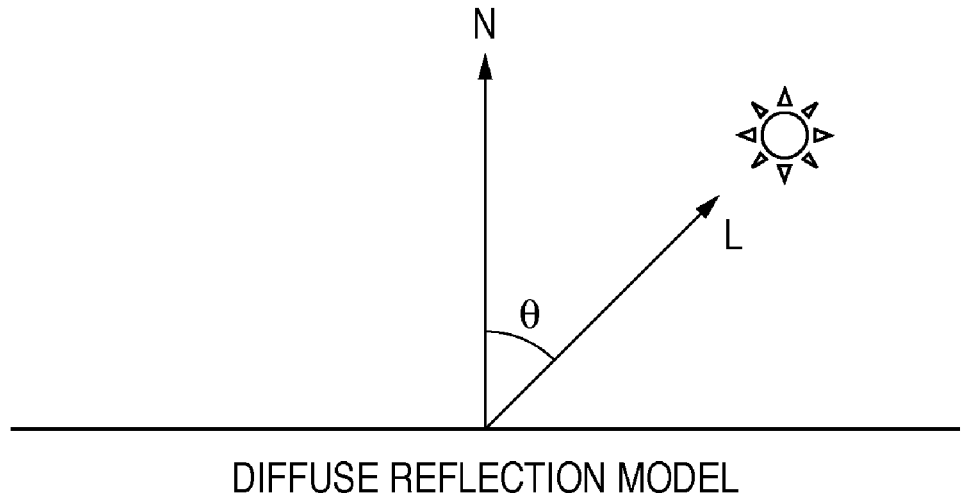
FIG. 12 is a conceptual view of a diffuse reflection model according to the first embodiment.

FIG. 12 is a conceptual view of a diffuse reflection model according to the first embodiment. A vector N is a normal vector representing the normal direction of an object surface. A vector L is an illuminant vector representing the direction of a light source. A diffuse reflective color calculation formula (diffuse reflection expression) based on this model is given by $$Cd = Id \times Kd \times (N \cdot L) \quad (5)$$

where Id is a parameter representing the light-source color,

Kd is a parameter representing the surface color of an object and its reflection intensity, and N·L is the inner product of the vectors N and L.

Figure 13:
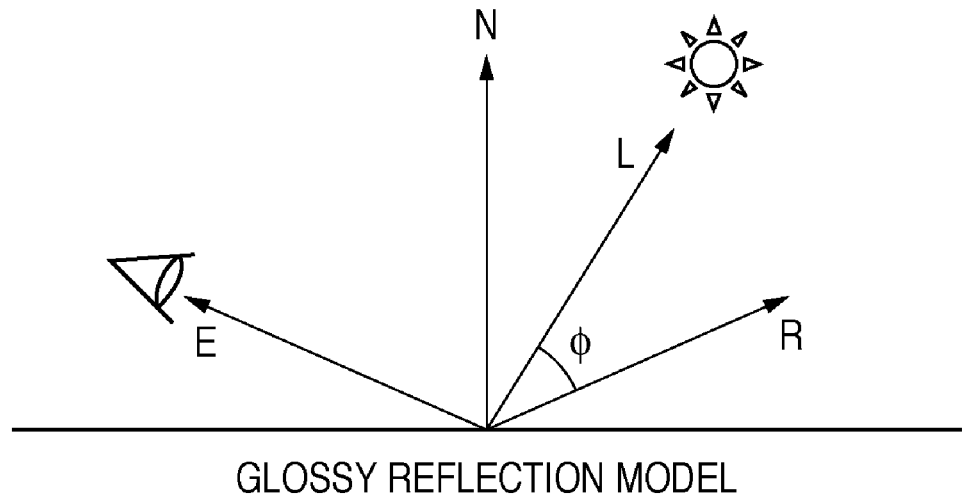
FIG. 13 is a conceptual view of a glossy reflection model according to the first embodiment.

FIG. 13 is a conceptual view of a glossy reflection model according to the first embodiment. A vector N is a normal vector representing the normal direction of an object surface. A vector L is an illuminant vector representing the direction of a light source. A vector E is a line-of-sight vector representing the direction of a line of sight. A vector R is the reflected vector of the vector E. A glossy reflective color calculation formula (glossy reflection expression) based on this model is given by $$R=-E+2(N \cdot E)N$$

$$Cs=Is \times Ks \times (L \cdot R)^n \qquad (6)$$

where Is is a parameter representing the light-source color (same as Id),

Ks is a parameter representing the color of a glossy component and its reflection intensity, L·R is the inner product of the vectors R and L, and n is a parameter representing the scattered degree of gloss.

The CPU 104 calculates the reflective colors Cd and Cs in the respective reflection models and adds them, thereby calculating a final reflective color C.

$$C=Cd+Cs \qquad (7)$$

In the above-described way, it is possible to easily generate a normal map to reproduce the surface of a printing paper sheet (medium) using CG at a low cost using an image input device such as a general-purpose scanner. Print preview reflecting the characteristic difference (the difference in bumpiness on the printing paper sheet surface based on the finish difference) between printing paper sheets can be done using the generated normal map. At this time, it is possible to do more real print preview by reproducing reflection, bumpiness of matte finish, and roughness on the printing paper sheet surface in accordance with the finish of the printing paper sheet.

In the above-described example, a flatbed scanner is used as the image input device for obtaining the bumpiness information of a printing paper sheet surface. However, any other device may be used if the information of the direction of bumpiness on a printing paper sheet surface is obtained.

As the pixel value (luminance value) used in the above-described embodiment, a luminance value calculated from R, G, and B components may be used. Alternatively, a G value representing a gray G component may be used as an approximate value.

The surface data (normal map) of the printing paper sheet obtained by the processing in FIG. 5 may be recorded together with the type of printing paper sheet (glossy paper, matte finished paper, and matte paper) and the name (e.g., trade name) of the printing paper sheet designated by the user. In this case, the user selects surface data using the name of the printing paper sheet on the preview UI shown in FIG. 10. In step S904 in FIG. 9, a rendering method corresponding to the type of printing paper sheet of the selected surface data is determined.

The types of printing paper sheet are not limited to glossy paper, matte finished paper, and matte paper. Any other types of printing paper sheet may be used. For example, silky paper can be used. Processing having a largest visual effect on silky paper is surface processing such as matte finish. When a scan image is directly used, the surface processing is hard to see because of distortion of paper. Hence, high-pass processing is executed to make it difficult to see the distortion component of paper and enhance the surface processing.

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the first embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforementioned storage medium, the storage medium stores program code corresponding to the flowcharts described in the first embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-324011, filed Dec. 14, 2007, which is hereby incorporated by reference herein in its entirety.

What is claimed is:

1. An image processing apparatus comprising:
    an input unit configured to input image data representing a characteristic of a surface of paper, the image data being obtained by reading the surface of the paper using an image input device;
    a filtering processor unit configured to perform a filtering process corresponding to a type of finish of the paper; and
    a map generating unit configured to generate a normal map from the image data on which the filtering process is performed.

2. The apparatus according to claim 1, further comprising:
    a setting unit configured to set a rendering method corresponding to the type of finish of the paper; and
    an image generating unit configured to generate a preview image corresponding to an image printed on the paper using the set rendering method, the normal map, and a bump mapping method.

3. The apparatus according to claim 1, wherein the image input device is a general-purpose image scanner.

4. The apparatus according to claim 1, further comprising a determination unit configured to determine the type of finish of the paper by analyzing the image data.

5. The apparatus according to claim 4, further comprising an interface configured to display the type of finish of the paper determined by the determination unit and to receive a designation of a type of finish.

6. The apparatus according to claim 4, wherein the determination unit determines the type of finish of the paper based on a frequency characteristic of a change in a pixel value of the image data.

7. A method of controlling an image processing apparatus, the method comprising:

using a processor to perform the steps of:

inputting image data representing a characteristic of a surface of paper, the image data being obtained by reading the surface of the paper using an image input device;

performing a filtering process corresponding to a type of finish of the paper; and generating a normal map from the image data on which the filtering process is performed.

8. The method according to claim 7, wherein the processor further performs the steps of:

setting a rendering method corresponding to the type of finish of the paper; and generating a preview image corresponding to an image printed on the paper using the set rendering method, the normal map, and a bump mapping method.

9. A non-transitory computer-readable medium storing a computer-executable program for causing a computer to perform a method of controlling an image processing apparatus, the method comprising:

inputting image data representing a characteristic of a surface of paper, the image data being obtained by reading the surface of the paper using an image input device;

performing a filtering process corresponding to a type of finish of the paper; and generating a normal map from the image data on which the filtering process is performed.

\* \* \* \* \*